United States Patent Office 3,183,185
Patented May 11, 1965

3,183,185
OXYGEN REMOVAL FROM WATER BY MEANS OF ION EXCHANGER RESINS
Karl Haagen, Leverkusen, Germany, assignor to Farbenfabriken Bayer Aktiengesellschaft, Leverkusen, Germany, a German corporation
No Drawing. Filed Apr. 4, 1960, Ser. No. 19,473
Claims priority, application Germany, Apr. 9, 1959, F 28,153
5 Claims. (Cl. 210—26)

This invention relates to a process by which oxygen dissolved in water is removed with the aid of ion exchanger resins.

It has been attempted to adapt the procedure used for removing electrolyte from water with the aid of ion exchanger resins to the removal of oxygen from water.

For example, there have been investigated for such purposes synthetic resins which effect the fixing of the atmospheric oxygen dissolved in water by groups which reversibly be oxidised or reduced. Thus, a plurality of redox systems have been incorporated by various methods into synthetic resins and the properties of the resulting redox exchangers have been investigated and described (see Ullmann, "Enzyklopädie der technischen Chemie, 3rd Edition, 1955, vol. 6, page 477).

However, none of these exchangers has yet achieved practical importance. Generally speaking, the capacity and the reaction velocity thereof with respect to the atmospheric oxygen dissolved in the water are too low, or the stability of the exchangers or the bonding strength of the redox systems to the resin structure are not satisfactory. The problem of removing oxygen from water with the aid of reversible redox systems has thus still not been solved in practice.

A process for removing oxygen from industrial water is also disclosed in French patent specification 855,849, in which the use of a redox system in the exchanger is dispensed with. The water in this case is conducted through an ion exchanger filter, which contains sulphite ions combined in salt form to serve as reducing agent. Practical tests have however shown that the oxidation of this ion by the dissolved atmospheric oxygen to the sulphate ion definitely takes place too slowly at room temperature for the oxygen to be removed in a technically satisfactory manner from the water by this method.

In order to overcome the important defects to this process, it has been proposed to use anion exchanger resins for the removal of oxygen from its solutions in water, which resins carry both strongly basic and also weakly basic functional groups and are charged with anions of dithionous acid.

The primary object of the present invention is a new process for removal of oxygen from oxygen containing water by means of ion exchanger.

It is a further object of this invention, to overcome the disadvantages of the aforementioned processes for oxygen removing.

Another object of this invention is a process for removal of oxygen from water containing oxygen and electrolytes.

A further object is a method for preparing special charged ion exchangers.

A further object of this invention is a regenerating method for exchanger being exhausted by oxygen removal procedure in conformance with the process of this invention.

Now, in accordance with the present invention, it has been found that a more productive and economic process for the removal of oxygen dissolved in water is provided if there are used for this purpose anion exchanger resins which are charged with polysulphide. The deoxygenized water is if necessary thereafter conducted through a mixture of elementary sulphur and a strongly basic anion exchanger in salt form.

The present process is distinguished from the aforementioned process by the different method of charging the active exchange groups. The charging of the exchanger in accordance with the invention by means of a reducing agent which does not produce any acid on oxidation also makes it possible to dispense with a neutralization capacity in the exchanger resin and leads to an approximate doubling of its reduction capacity.

Reducing agents which do not produce any acid on oxidation are for example the salts of hydrogen sulphide, the sulphides. However, the charging of an exchanger with alkali sulphide still does not lead to satisfactory results.

For the charging with sulphide ions, only strongly basic exchangers can be used, since weakly basic exchangers are converted into the basic form by the alkaline sulphide solutions with which the charging is carried out.

If water which is freed from salt and which is saturated with air is conducted over the sulphides of such strongly basic exchangers, it is certainly possible to establish that oxygen is undoubtedly combined with the exchanger. The speed of the oxidation is however much too slow for it to be possible completely to remove the oxygen from the water during the usual filtering period.

In addition, although the water had previously been desalted, the filter discharge constantly contains some hydrogen sulphide, which probably forms because of hydrolysis of the exchanger sulphide and is entrained by the water flowing through. It is true that the concentration thereof is small (about 6 mg. per litre of water), but nevertheless it is known that the removal of such traces of a very weak acid from the water presents difficulties, so that therefore strongly basic anion exchangers in the sulphide form are not to be considered for the present purpose.

The present invention is based on the discovery that the defects which are inherent in the use of an exchanger charged with sulphide ions can be avoided by these exchangers being transformed into the polysulphide form.

It has been found that sulphur is dissolved in the sulphide of a strongly basic anion exchanger to a considerably better degree than, for example, in sodium sulphide, that is to say, when an aqueous polysulphide solution passes through a filter, which is charged with an anion exchanger in the sulphide form, it passes from the aqueous solution into the exchanger. Although the polysulphide of the exchanger represents the salt of a strongly basic cation, it is only slightly hydrolyzed, in contrast to the simple sulphide, but in addition it is scarcely dissociated in practice, so that a discharge free from hydrogen sulphide can be obtained when filtering salt-free water. In addition to this important advantage which the polysulphide exchanger has in comparison with the corresponding sulphides, there is the additional advantage of the greater reactivity with respect to elementary oxygen, which enables the oxygen dissolved in the water to be completely removed within the filtering times usual for ion exchange reactions. Thiosulphate is then formed in accordance with the empirical equation $$S_2^{--} + 3O = S_2O_3^{--}$$

Therefore, no acid reaction occurs and the thiosulphate ion which is formed also has the property which is very valuable for the present process, namely, that in contrast to polysulphide, it can easily be replaced by other ions. The thiosulphate ion which is formed can be displaced with approximately the theoretical quantity of $Na_2S_2$ from 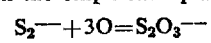 the exchanger, the latter maintaining its full reduction capacity.

The exchanger resins which can be used for the process according to the present invention are represented by known usual strongly basic exchanger resins.

The strongly basic ion exchanger employed in the practice of the present invention are ion exchanger resins containing quaternary ammonium groups of the general formula

wherein $R_1$, $R_2$ and $R_3$ represent lower alkyl- or hydroxyalkyl groups, containing 1 to 8 carbon atoms which may be branched or not and wherein the radicals $R_1$, $R_2$ and $R_3$ may be identical among themselves or not. Preferably the radicals $R_1$, $R_2$ and $R_3$ are represented by methyl, ethyl or hydroxyethyl. Further in this formula X means a hydroxyl anion or a salt-forming anion of organic or inorganic acids, as for example hydrochloric, sulphuric, thiosulphuric, nitric, phosphoric, acetic acid, preferably a hydrochloric anion.

The chemical nature or origin of the exchanger resin matrix is of no importance. Resins having only primary or secondary or tertiary amino groups may be quaternized either partially or completely.

It is possible to use condensation resins such as for example nitrogen containing resins derived from ethers of aromatic hydroxy compounds as described in German Patent 959,947. Other examples for the condensation resins which may be employed are resins obtained by condensation of aldehydes or ketones, especially formaldehyde, with aromatic or alipatic amines. Resins of this type and the related types are disclosed in Ullmann, "Enzyklopädie der technischen Chemie," 3rd Edition, vol. 8, Munich-Berlin, 1957, page 811. The list of the condensation resins which may be used is not limited to these. Also different other types, as for example condensation products of aminotriazin with aldehydes, urea- or melamine aldehyde condensation products, condensation products of polyepoxy compounds and aliphatic polyamines or of polyalkylene polyamines and epichlorhydrine and many other related resins may be employed provided that they contain quaternary ammonium groups.

Suitable polymerization resins are for example cross-linked vinyl aromatic polymerization products, such as derived from styrene and derivatives thereof, for example methylstyrene, vinylanisol, vinylnaphthalene as well as mixtures thereof and a cross-linking agent, which have been chlormethylated and subsequently reacted with amines in known manner. The preparation of exchange resins of this type for example is described in the German patent applications Deutsche Auslegeschriften 1,058,737 and 1,010,738 and German Patents Nos. 848,257 and 829,223. Other processes for producing cross-linked polystyrene by halogeno alkylation and subsequent amination are disclosed in U.S. patent specifications 2,591,573; 2,591,574; 2,614,099; 2,616,877; 2,629,710; 2,631,999; 2,632,000; 2,642,417; 2,725,361; 2,794,785. Further polymerization resins which may be employed in the process of the present invention are described or respectively cited in Ullmann, "Enzyklopädie der technischen Chemie," 3rd Edition, vol. 8, Munich-Berlin, 1957, page 812.

Further there may be employed anion exchange resins with sponge structure, that is to say anion exchange resins with high exchanging velocity which may be obtained if the polymers used for the halo-alkylation and subsequent amination are those which are obtained by polymerization of aromatic vinyl-compounds with the cross-linking agent in presence of at least 20 parts by weight (calculated on the amount of the monomers) of solvents which will dissolve the monomers but are not able to dissolve linear aromatic vinyl polymers. Exchange resins of this type are disclosed in German patent applications Deutsche Auslegeschriften 1,049,583; 1,045,102 and 1,054,715.

The amounts of cross-linking agents to be used in production of polycrization resins can fluctuate within wide limits. Generally these amounts range betwen about 0.5 to 50 parts by weight as based on the total amount of the monomers are used. In the case of aromatic compounds having several vinyl groups these amounts can, however, be exceeded. Suitable cross-linking agents are for example divinylbenzene, trivinyl benzene, ethylene glycol dimethacrylate, diallyl maleinate, divinyl ether and the like.

Although any condensation and polymerization resins are in principle suitable, preference is given to the weakly cross-linked anion exchangers having large pores because of their physical structure, as compared with strongly cross-linked anion-exchangers having small pores. The danger which exists with anion exchangers having small pores is that not all of the active exchange groups benefit from the reduction capacity. In the case of polymerization resins those are preferred which have incorporated therein about 2–10% by weight of cross-linking agent.

Mixed exchangers of basic nature, i.e., with both weakly basic and strongly basic function, can also be successfully used in the polysulphide form for removing oxygen from water.

The charging of the above defined strongly basic exchangers with polysulphide sulphur can be effected with aqueous solutions containing dissolved therein alkaline metal or ammonium polysulphides in which the sulphur content is higher than in the corresponding monosulphides, whereby the sulphur content may be stoichiometric or non-stoichiometric as calculated on the cation present in the solution (see also Holleman-Wibert, "Lehrbuch der anorganischen Chemie," 24th and 25th Editions, Berlin, 1954, page 190). Preferably solutions of sodium disulphide or sodium polysulphide with higher sulphur content as for example corresponding to the formulas $Na_2S_4$, $Na_2S_5$ may be used.

When the strongly basic anion-exchangers are charged with a polysulphide solution as recited above, there is formed an anion exchange resin the quaternary ammonium groups of which are charged with polysulphide ions containing at least 4 or 5 sulphur atoms. Therefore, the use of the theoretical quantity of sodium di- or tri-sulphide leads to the formation of anion exchange groups charged with the polysulphide ions just mentioned in addition to anion exchange groups charged with monosulphide ions. If an aqueous sodium disulphide or trisulphide solution is conducted from above through a filter in which the anion exchanger is present in the form of chloride or sulphate, there is not only a replacement of the chloride or sulphate, ions of the exchanger by $S_2^{--}$ or $S_3^{--}$, but the polysulphide of the exchanger formed in the upper resin layer extracts the sulphur from the aqueous polysulphide solution flowing through, so that this solution only passes into the subjacent resin layers as sodium sulphide solution and discharges in colourless form. The charging of the exchanger with polysulphide salphur can be satisfactorily followed from the discoloration of the exchanger when the experiment is carried out in a glass tube. The exchanger assumes a stronger reddish brown colour as more sulphur is taken up, and the zone or limit between the polysulphide and the sulphide form of the exchanger increasingly advances downwardly during the charging until it finally reaches the lower end of the filter and the discharging sodium sulphide now also contains polysulphide sulphur.

Even an aqueous sodium polysulphide solution saturated with sulphur gives off all the polysulphide sulphur to the exchanger in passing through the filter and finally leaves the latter as colourless sodium sulphide solution. Consequently, with strong basic ion exchangers, polysulphide ions can be obtained with a higher sulphur content than that of an aqueous sodium polysulphide solution saturated with sulphur.

The great affinity of the sulphur for the exchanger sulphide is further shown by the fact that there is a considerable contraction in volume of the exchanger due to the absorption of sulphur. The exchanger polysulphide has substantially more sulphur than corresponds to the disulphide, and consequently, with the oxidation of such a filter during operation, the excess sulphur is deposited in elementary form in and on the ion exchanger without, however, passing in the water flowing through, neither in colloidal or suspended form. On the other hand, the sulphur does not clog the pores of the exchanger and on regeneration with $Na_2S_2$, the sulphur is immediately combined again as polysulphide sulphur with the basic exchanger groups.

The concentration of the alkali polysulphide solutions used is not decisive. Preferably solutions are employed containing 2 to 20 parts by weight of alkali polysulphide.

The exchangers charged with polysulphide anion as herein defined may contain amounts of sulphur which can fluctuate within wide limits. Preferably the charged exchangers contain sulphur amounts from 10 to 300 g./l. exchanger, saturated with swelling water.

On account of the great affinity of sulphur or polysulphide ions with a high sulphur content for the basic groups of the exchanger, the process of the invention permits the removal of oxygen not only from electrolyte-free water, but also from untreated water, from partially desalted water or soft water. Therefore, if only the dissolved oxygen is to be removed from a water, while removal of salt is not necessary, or if it is intended first of all to remove the oxygen and only then to remove the electrolyte from a water, the removal of the oxygen can be effected with the polysulphide of a strongly basic exchanger.

The discharge of the reduction filter can however often contain traces of sodium sulphide or hydrogen sulphide when using water containing electrolyte. In this case, it is preferred to connect an additional filter after the reduction filter, the said additional filter containing a mixture of a strongly basic exchanger in the salt form (as defined above), preferably in the chloride or sulphate form or in another as far as possible dissociated salt form and elementary sulphur. It follows from the characterization of the exchanger sulphide as indicated above that it is preferable to use here a quantity of sulphur which corresponds at least to the tetrasulphide of the exchanger. Owing to the difficulty of producing a completely uniform distribution of the sulphur in the exchanger, it is generally advisable to have a very large excess of sulphur. The second filter holds back the traces of sulphide ions, so that the discharge from this filter certainly contains the electrolytes of the untreated water, but is free from both oxygen and sulphide ions.

The removal of oxygen from water containing electrolyte obviously does not necessitate the use of two separate filters, but can also be carried out in one filter. That half of the filter facing the untreated water inlet contains the exchanger in the polysulphide form, while the other half of the filter contains a mixture of the same exchanger in the form of a strongly dissociated salt and sulphur.

Generally, it is sufficient for the exhausted exchanger to be regenerated with an appreciable deficiency of $Na_2S_2$, so that only a part thereof is transformed into the polysulphide form, while the residual exchanger is a mixture of the exhausted exchanger and the excess sulphur separated out in the oxidation. Moreover, it is also possible to use polysulphide solutions with sulphur content higher than the disulphide. Preferably solutions are used with a polysulphide content of about 2 to 20 parts by weight. The charging of the filter with oxygen then takes place in the same direction as that in which the regeneration was carried out. The filter can be operated for long periods, even when only about half of the exchanger is regenerated, since the reduction capacity of the strongly basic ion exchanger charged with polysulphide can be thoroughly utilized and is comparatively high, owing to the great speed of oxidation and the easy and practically complete transformation into this charging condition. Moreover, the regeneration and the subsequent washing of the filter only requires a little time, since the regenerating agent is used in a deficient quantity.

The use of polysulphides of strongly basic anion exchangers has appreciable advantages by comparison with those of dithionites. The practically 100% utilization of the reducing agent and the lower cost price thereof provide the process with the advantage of great economy, and in addition makes possible a more extensive use thereof with untreated waters containing electrolyte.

The following examples explain further details of the present invention.

*Example 1*

25 cc. of a strongly basic anion exchanger with the base of phenoxyethyltrimethylammonium chloride according to German Patent 959,947, Example 7 (capacity about 75 millival per 100 cc. of swelled exchanger, grain size 0.3 to 0.5 mm.) were placed in a glass tube with an internal diameter of 12 min. 50 cc. of a polysulphide solution containing 30 millival of $Na_2S$ and saturated with sulphur were slowly supplied through this exchanger from above. The exchanger shrank on being charged with polysulphide and became a pronounced reddish-brown colour. After the passage of 33 cc. of polysulphide solution, colourless sodium sulphide solution discharged. Moreover, with the subsequent washing out of the excess polysulphide solution, only sulphur ions and no polysulphide sulphur could be detected in the discharge. The discharge contained a total of 10.8 millival of $Na_2S$, so that 19.2 millival had been taken up by the exchanger. All the polysulphide sulphur of the solution which was employed was not contained in these 19.2 millival of sulphide ions. The polysulphide sulphur available was not sufficient completely to transform the exchanger into the reddish-brown polysulphide form, since approximately 2 cm. at the bottom of the filter charge still showed their original yellowish-brown colour.

Salt-free water saturated with air was now conducted through this filter from below. The first 23.3 litres ran through the filter in 73 hours, so that an average specific loading $$\left( = \frac{\text{Vol. of exchanger}}{\text{Throughput per hour}} \right)$$

of 1:12.7 is estimated. The specific loading was always lower during the night; it was however, increased during the day to 1:30 without oxygen appearing in the discharge. After being inoperative for 63 hours, the filter was again set in operation. In 53 hours, another 15 litres of water were freed from oxygen, so that until the appearance of oxygen after 126 hours, a total of 38 litres of water had run through the filter. Leucomethylene blue served as indicator for the appearance of oxygen, this indicator being combined with a cation exchanger and being included in the discharge pipe of the filter. At the appearance of oxygen, approximately the uppermost 2 cm. of the filter charge were practically unchanged as regards colour, i.e., they were predominantly in the polysulphide form. The next approximately 3 cm. layer of the charge showed oxidized granules, increasing downwardly, the remainder of the exchanger was completely in the oxidized form. The pH values measured in the discharge during the long period of the water flowing through varied between 6.8 and 7.2 (6.5 with the appearance of oxygen). Hydrogen sulphide could not be detected in the discharge.

*Example 2*

Two samples, each of 25 cc. of an exchanger according to Example 1 in the polysulphide form were each placed in a glass tube and each was washed with 100 cc. of water. 500 cc. of 2.7% $Na_2SO_4$ solution were now passed through one filter (filter 1), while the same quantity of a 3% NaCl solution was passed through the other filter (filter 2). After washing out the salt solutions, salt-free water saturated with air was conducted from below through the two filters. The appearance of oxygen in filter 1 occurred after a throughput of 39.5 litres of water, and in filter 2 after a throughput of 41.8 litres of water. After the throughput of a quantity of electrolyte which (in equivalents) is about twelve times as great as the polysulphide present in the exchanger and as the quantity of $Na_2S_2$ necessary for regenerating the exhausted exchanger, the exchangers are still capable of combining the oxygen content of about 40 litres of water saturated with air. These experiments show the strength with which the polysulphide is fixed on the exchanger. The exhausted exchanger contains thiosulphate ions and elementary sulphur. Since only 2 atoms of sulphur react in the oxidation of the sulphide, it is also only necessary for 2 atoms of sulphur to be replaced per mol of polysulphide when regenerating the exhausted exchanger. This is effected with $Na_2S_2$, and in fact 2.5 g. of

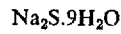

$Na_2S.9H_2O$ and 0.35 g. of sulphur, dissolved in 25 cc. of water, that is to say, about 10 millimols of $Na_2S_2$, are sufficient for regenerating the 25 cc. of exchanger.

In the second run, prior to which there was now no treatment of the exchanger with $Na_2SO_4$ or NaCl solution, 43 litres of water saturated with air were freed from oxygen in the first filter and 58 litres of water saturated with air were freed from oxygen in the second filter. After another regeneration of the first filter with 2.5 g. of $Na_2S.9H_2O$ and 0.35 g. of sulphur, oxygen only appeared with this filter after a throughput of about 51 litres of water.

Taking an oxygen content of 8.5 mg. per litre as the basis of the air-saturated water, 8.8 millimols of $Na_2S_2$ are oxidized to thiosulphate by 50 litres of water. This thiosulphate can be completely displaced by 10 millimols of $Na_2S_2$, the exchanger being restored to its full reduction capacity. Actually, with the regeneration of the exhausted exchanger with $Na_2S_2$, this quantity of thiosulphate could be quantitatively determined in the regenerate.

*Example 3*

A strongly basic exchanger based on phenoxyethyltrimethyl ammonium chloride according to German Patent 959,947 (Example 7), and having a somewhat higher exchange capacity (1 millival per 1 ml. of the swelled exchanger) was employed, this capacity being produced by subsequent introduction of chloromethyl groups with formaldehyde and hydrochloric acid and reaction thereof with dimethylaminoethanol. The grain size was again between 0.3 and 0.5 mm. The exchanger was transformed into the polysulphide form with excess sodium polysulphide solution saturated with sulphur. 25 cc. of this polysulphide form were introduced into a glass tube with an internal diameter of 12 mm. The discharge from this filter 1 was conducted through a second filter containing a mixture of 30 cc. of the same exchanger in the chloride form and 6 g. of powdered sulphur.

Spring water with a total hardness of 14.5° G. (German hardness) and a permanent hardness of 6.3° (German hardness) was used as air-saturated water. The anion content of the water is equivalent to 13 German degrees of hardness, so that the total electrolyte content of the water would correspond to 21.2 German degrees of hardness or 7.57 milliequivalents of an electrolyte.

The water was saturated with air and, without altering the electrolyte content, conducted from above through filter 1 and thereafter from below through filter 2. Connected between the two filters was a three-way cock, through which the discharge from filter 1 could as desired be taken for analysis purposes or could be conducted through a leucomethylene blue indicator tube. Such an indicator tube could also be connected in the discharge pipe of filter 2 by means of a three-way cock.

When operating in this way, the filter first of all combines all the oxygen dissolved in the entering water. The sulphide ions occurring because of the electrolyte present in the water in the discharge of filter 1 are combined in filter 2. The polysulphide being formed can in its turn again act to combine oxygen when the filter 1 is practically exhausted after a sufficiently long operating period.

The filter arrangement was charged in the following manner: Over a period of 102 hours, 40 litres of water flowed through the filter, corresponding to a specific charging of 1:15. After an interval of 63 hours, 34.5 litres of water were freed from oxygen over a period of another 101 hours. After another interval of 62 hours, a further 10 litres of water flowed through the filter over a period of 57 hours before any traces of oxygen could be detected in the discharge from filter 1.

Oxygen appeared in filter 1 after a throughput of 84.5 litres of water in 260 hours. The experiment was now continued until the exchanger in filter 1 was almost completely oxidized, this being the case after a total of about 102 litres of water had flowed through. The discharge from filter 2 was still always free from oxygen and also did not contain any sulphide ions.

The increasing quantities of oxygen in the discharge of filter 1 were thus combined in the second filter by the polysulphide which formed from the sodium sulphide which had been given up to the water in filter 1. The total electrolyte content of the untreated water does not change in flowing through the two filters, although some of the thiosulphate formed by the oxidation of the polysulphide is replaced by other anions of the untreated water.

The regeneration was now carried out by 50 cc. of a sodium sulphide solution containing 4.2 g. of $Na_2S.9H_2O$ being supplied to the second filter. While flowing slowly through the filter, polysulphide is formed with sulphur, which polysulphide was exchanged for thiosulphate ions and other anions present in the exchanger, so that the exchanger was transformed to the polysulphide form. The discharge from filter 2, which contained copious quantities of $S_2O_3^{--}$, was only then conducted through the filter 1 from below when it contained sodium polysulphide, which was only the case on washing the filter. This excess polysulphide was combined or fixed in the lower part of the filter 1, so that the discharge from this filter was free from sulphide ions. The filters were now set in operation again for removing oxygen from untreated water, the water flowing through the filters in the opposite direction during the second operational period, that is to say, entering the filter 2 from above and leaving the filter 1 at the top.

Since in this process oxygen or sulphide ions are not given up to the water, either during the regeneration of the filters or during the chemical binding of the atmospheric oxygen dissolved in the water, and a further decomposition of the reducing agent does not take place, the consumption of $Na_2S_2$ corresponds to the theoretical quantity which is obtained from the oxidation equation $S_2^{--}+3O=S_2O_3^{--}$. The use of a mixture of a strongly basic anion exchanger and elementary sulphur for combining sodium sulphide in the second filter provides the advantage of a substantially greater absorption capacity for sulphide ions. This is apparent from the following experiments, in which the same exchanger as in Example 3 was employed.

(*a*) A $Na_2S$ solution containing 0.38 g. of $Na_2S.9H_2O$ per litre was conducted through 25 cc. of the exchanger in the chloride form, which was placed as a filter column in a glass tube. The solution had been prepared with degassed and salt-free water. The appearance of sulphide ions occurred after a throughput of 1100 cc. The exchanger had therefore taken up the sulphide ions of only 0.42 g. of Na₂S. After regenerating the exchanger with NaCl and HCl and washing out, the experiment was repeated with a solution containing 0.288 g. of Na$_2$S.9H$_2$O per litre of degasified spring water. The sulphide ions appeared after a throughput of 1350 cc. of water and a sulphide absorption which corresponds to 0.389 g. of Na$_2$S.9H$_2$O.

(b) The same exchanger was now charged with excess sodium polysulphide solution saturated with sulphur. After washing out the polysulphide, 300 cc. of 0.1 N-hydrochloride acid were passed through the filter and following this 5% NaCl solution. By this treatment, the exchanger was converted to the chloride form. At the same time, elementary sulphur had separated out in and on the grains of the exchanger. After washing out with water, dilute sodium sulphide solution was conducted through the filter, as in the preceding experiments. The reddish-brown polysulphide of the exchanger appeared. The progress of the absorption of sulphide could be easily followed from the change in colour. The appearance of sulphide ions only occurred after an absorption of sulphide ions, corresponding to 3.17 g. of Na$_2$S.9H$_2$O. It was also found that it is not necessary to produce a high distribution of the sulphur through the polysulphide of the exchanger, but that it is sufficient to mix the exchanger in salt form with powdered sulphur in order to produce a similar increase in capacity.

*Example 4*

A strongly basic anion-exchanger of sponge structure based on a copolymerization product of styrene and divinyl-benzene according to German patent application DAS 1,054,715, Example 2, was used.

200 cc. of this exchanger (grain size 0.3 to 1.0 mm.) prepared in pearlform had been freed from water soluble contaminations by washing. Thereafter the exchanger was placed in a conical glass tube and transformed into the polysulphide-form by slowly supplying through an aqueous polysulphide solution containing 12 g. Na$_2$S.9H$_2$O and 5 g. sulphur per 100 cc. The original white pearls change colour by charging with polysulphide into reddish-brown. At the same time shrinking of the exchanger is observed.

After washing out the excess of polysulphide-solution, the filter was supplied with salt-free water saturated with air.

A part of the discharge was conducted through an indicator-tube, containing leukomethylene-blue combined with an ion exchanger. Appearance of blue colour in the leukomethylene-blue tube indicates the appearance of oxygen in the discharge.

The latter was observed after a throughput of about 500 l. water. The proceeding of the polysulphide-oxydation is recognizable by change of the colour of the exchanger pearls from reddish-brown to white.

What I claim is:

1. Process for removing oxygen from oxygen containing water by means of ion exchangers charged with reducing agents which comprises contacting the oxygen-containing water with a water-insoluble anion exchanger resin containing quaternary ammonium groups to which are ionically bonded polysulfide ions.

2. Process for removing oxygen from water containing oxygen and electrolytes by means of ion exchangers charged with reducing agents, characterized by contacting said water first with a water-insoluble anion exchanger resin containing quaternary ammonium groups to which are ionically bonded polysulfide ions, and thereafter with a mixture of sulfur and a water-insoluble anion exchanger resin containing quaternary ammonium groups in salt form.

3. Process according to claim 1, wherein said exchanger after exhaustion is regenerated with an aqueous solution of a polysulphide.

4. Process according to claim 3, wherein said polysulphides are selected from the group consisting of alkali metal polysulphides and ammonium polysulphides.

5. Process according to claim 3, wherein said polysulphide is sodium disulphide.

References Cited by the Examiner

FOREIGN PATENTS

| | | |
|---|---|---|
| 622,245 | 6/61 | Canada. |
| 75,970 | 9/54 | Holland. |
| 1,067,217 | 10/59 | Germany. |

OTHER REFERENCES

Kunin: Ion Exchange Resins, pages 140–143, John Wiley and Sons, New York, 2nd Edition (1958).

WILLIAM H. SHORT, *Primary Examiner.*

H. N. BURSTEIN, *Examiner.*